(12) United States Patent
Yang

(10) Patent No.: US 7,403,406 B1
(45) Date of Patent: Jul. 22, 2008

(54) ELECTRONIC CURRENT LIMITER

(75) Inventor: Wen-Ho Yang, Bali (TW)

(73) Assignee: Sun-Lite Sockets Industry Inc., Taoyuan (TW)

( * ) Notice: Subject to any disclaimer, the term of this patent is extended or adjusted under 35 U.S.C. 154(b) by 0 days.

(21) Appl. No.: 11/842,493

(22) Filed: Aug. 21, 2007

(51) Int. Cl.
*H02M 7/00* (2006.01)

(52) U.S. Cl. ...................................... 363/125

(58) Field of Classification Search ............ 363/28, 363/35, 40, 86, 125; 323/237, 240, 247, 323/265, 271, 300, 301
See application file for complete search history.

(56) References Cited

U.S. PATENT DOCUMENTS

| | | | | |
|---|---|---|---|---|
| 4,325,008 A | * | 4/1982 | Borland et al. | 315/241 R |
| 4,811,188 A | * | 3/1989 | Bees | 363/28 |
| 5,852,550 A | * | 12/1998 | Majid et al. | 363/21.05 |
| 6,621,254 B1 | * | 9/2003 | Williams | 323/239 |
| 2004/0070474 A1 | * | 4/2004 | Wu et al. | 335/18 |

* cited by examiner

*Primary Examiner*—Matthew V Nguyen
*Assistant Examiner*—Nguyen Tran
(74) *Attorney, Agent, or Firm*—Alan Kamrath; Kamrath & Associates PA

(57) ABSTRACT

An electronic current limiter includes a power supply transformation circuit to transform an alternating-current power supply into a direct-current power supply, a current detection circuit to sense and detect a current from the input terminals of the power supply transformation circuit and a detection control circuit to turn on or off the power supply according to an output signal of the current detection circuit. Thus, when the load current of the lamp is increased to exceed a predetermined value, the power supply to the lamp is interrupted to turn off the lamp so as to prevent the lamp from being worn out due to an excessive load current.

10 Claims, 1 Drawing Sheet

ELECTRONIC CURRENT LIMITER

BACKGROUND OF THE INVENTION

1. Field of the Invention

The present invention relates to an emergency protective circuit device and, more particularly, to an electronic current limiter that limits a load current (or power) of an illuminating lamp.

2. Description of the Related Art

An electronic current limiter is used to limit a load current (or power) of an illuminating lamp to prevent the illuminating lamp from being burnt or worn out due to an excessive load current. The control circuit structure of the conventional electronic current limiter comprises a sampling circuit, a rectification filter circuit, an amplification comparison circuit and an output control circuit. The amplification comparison circuit includes a current transformer, a comparator, a silicon control rectifier (SCR) and a relay. When the load current of the illuminating lamp exceeds a predetermined value, the relay is actuated by the silicon control rectifier to turn off the illuminating lamp to prevent the illuminating lamp from being burnt or worn out due to an excessive load current. However, the conventional electronic current limiter has a complicated construction, an unstable performance, lower precision and reliability and a higher cost of maintenance.

BRIEF SUMMARY OF THE INVENTION

In accordance with the present invention, there is provided an electronic current limiter, comprising a power supply transformation circuit to transform an alternating-current power supply into a direct-current power supply, a current detection circuit to sense and detect a current from the input terminals of the power supply transformation circuit and a detection control circuit to turn on or off the power supply according to an output signal of the current detection circuit. The power supply transformation circuit includes two input terminals and a direct-current output terminal. The current detection circuit includes a current transformer which consists of a primary coil and a secondary coil. The primary coil of the current transformer of the current detection circuit is electrically connected between two lamp connecting terminals of the current detection circuit and the input terminals of the power supply transformation circuit, and the secondary coil of the current transformer of the current detection circuit is connected to a rectifying diode of the current detection circuit to form a voltage signal output terminal of the current detection circuit. The detection control circuit includes a silicon control rectifier, a relay and a reset switch. The relay of the detection control circuit is electrically connected between the direct-current output terminal of the power supply transformation circuit and a positive pole of the silicon control rectifier of the detection control circuit. The silicon control rectifier of the detection control circuit has a negative pole and a control gate electrically connected with the voltage signal output terminal of the current detection circuit. The reset switch of the detection control circuit is electrically connected with the voltage signal output terminal of the current detection circuit. The relay of the detection control circuit has a switch electrically connected between the primary coil of the current transformer of the current detection circuit and the lamp connecting terminals of the current detection circuit. The switch of the relay of the detection control circuit has a normally closed contact electrically connected with one of the lamp connecting terminals of the current detection circuit.

The primary objective of the present invention is to provide an electronic current limiter, wherein when the load current of the lamp is increased to exceed a predetermined value, the power supply to the lamp is interrupted to turn off the lamp so as to prevent the lamp from being worn out due to an excessive load current.

Another objective of the present invention is to provide an electronic current limiter, wherein the power supply transformation circuit can drop the voltage of the alternating-current power supply by the capacitor without needing a transformer so as to function as a simple direct-current steady-state voltage output circuit.

A further objective of the present invention is to provide an electronic current limiter, wherein the power supply transformation circuit has a smaller volume and has a simplified structure, thereby saving the space and the price.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
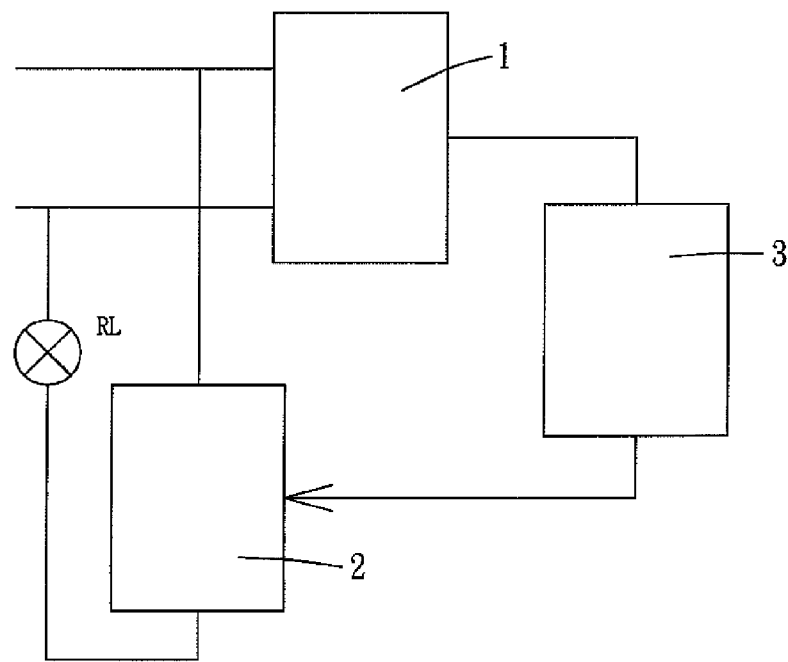
FIG. 1 is a block diagram of an electronic current limiter in accordance with the preferred embodiment of the present invention.
Figure 2:
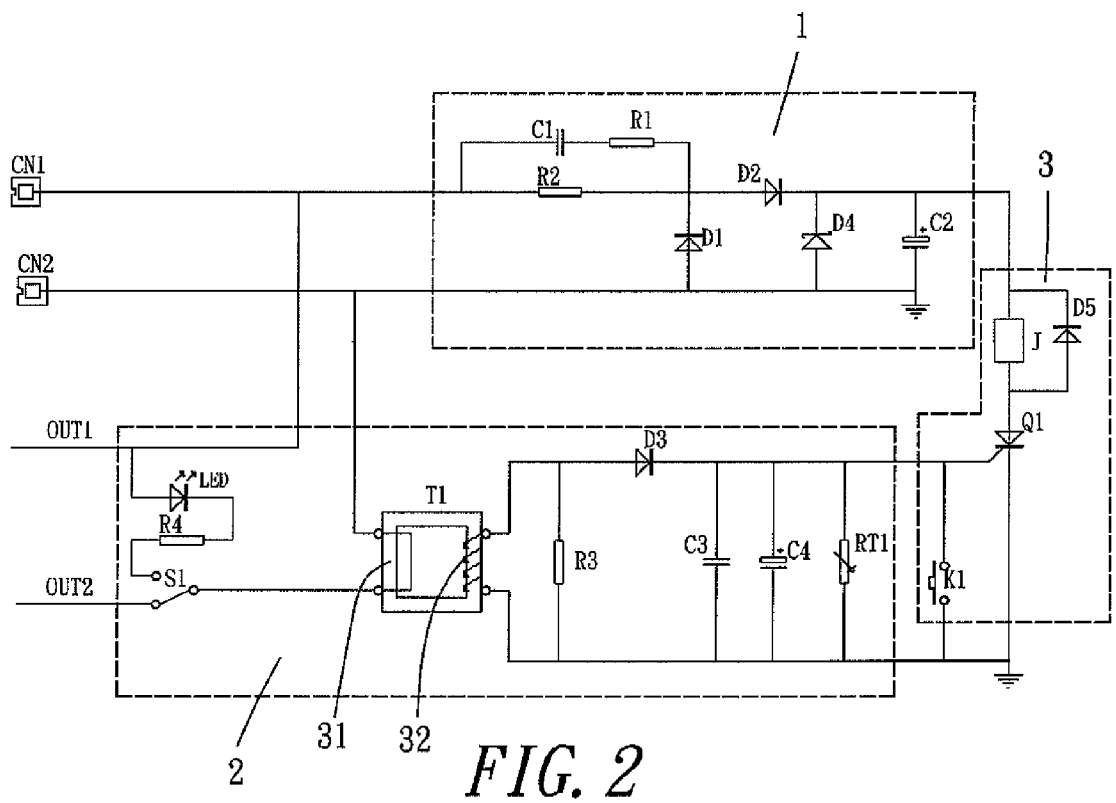
FIG. 2 is a circuit layout of the electronic current limiter in accordance with the preferred embodiment of the present invention.

Referring to FIGS. 1 and 2, an electronic current limiter in accordance with the preferred embodiment of the present invention comprises a power supply transformation circuit 1, a current detection circuit 2 and a detection control circuit 3.

The power supply transformation circuit 1 is used to transform an alternating-current power supply into a direct-current power supply. The power supply transformation circuit 1 includes two input terminals CN1 and CN2, a capacitor C1, a resistor R1, a resistor R2, a diode D1, a diode D2, a steady-state voltage diode D4 and an energy-storage filter capacitor C2. The resistor R2 and the diode D1 are connected with the input terminals CN1 and CN2. The capacitor C1 and the resistor R1 are connected serially. The capacitor C1 and the resistor R1 are connected with the resistor R2 in parallel. The diode D2 has a positive pole connected with the negative pole of the diode D1. The steady-state voltage diode D4 has a negative pole connected with the negative pole of the diode D2. The positive pole of the steady-state voltage diode D4, the positive pole of the diode D1 and the input terminal CN2 are grounded. The energy-storage filter capacitor C2 is connected with the steady-state voltage diode D4 in parallel. The energy-storage filter capacitor C2 has a terminal to function as a direct-current output terminal of the power supply transformation circuit 1.

In practice, an alternating current of the alternating-current power supply is supplied into the input terminals CN1 and CN2 of the power supply transformation circuit 1. Then, the alternating current passes through the capacitor C1, the resistor R1 and the resistor R2. Then, the alternating current passes through the diode D2 which rectifies the alternating current. Then, the rectified alternating current passes through the steady-state voltage diode D4 to perform a voltage stabilizing process. At this time, the capacitive reactance of the capacitor C1 is mush greater than the resistance of the resistor R1 and the resistor R2, so that when the alternating current passes through the capacitor C1, the resistor R1 and the resistor R2, the voltage drop is mainly concentrated on the capacitor C1. In such a manner, the capacitor C1 of the power supply transformation circuit 1 drops the voltage so that the power supply transformation circuit 1 can drop the voltage of the alternating-current power supply by the capacitor C1 without needing a transformer so as to function as a simple direct-current steady-state voltage output circuit. Thus, the power supply transformation circuit 1 has a smaller volume and has a simplified structure, thereby saving the space and the price. It is to be noted that the direct-current output signal of the power supply transformation circuit 1 has a determined voltage perturbation.

The current detection circuit 2 is used to sense and detect the current from the input terminals CN1 and CN2 of the power supply transformation circuit 1. The current detection circuit 2 includes a current transformer T1 which consists of a primary coil 31 and a secondary coil 32. The primary coil 31 of the current transformer T1 of the current detection circuit 2 is a conducting wire passing a magnetic core. The primary coil 31 of the current transformer T1 of the current detection circuit 2 is electrically connected between two lamp connecting terminals OUT1 and OUT2 of the current detection circuit 2 and the input terminals CN1 and CN2 of the power supply transformation circuit 1. A lamp (not shown) is connected with the lamp connecting terminals OUT1 and OUT2 of the current detection circuit 2. The secondary coil 32 of the current transformer T1 of the current detection circuit 2 is connected to a rectifying diode D3 of the current detection circuit 2 to form a voltage signal output terminal of the current detection circuit 2. The primary coil 31 of the current transformer T1 of the current detection circuit 2 has a coil number relatively larger than that of the secondary coil 32 so that when the current in the primary coil 31 of the current transformer T1 of the current detection circuit 2 produces a very little variation, the output voltage of the secondary coil 32 produces a very large variation. Thus, the current transformer T1 of the current detection circuit 2 has a larger signal variation ratio to facilitate the current detection circuit 2 detecting the current from the input terminals CN1 and CN2 of the power supply transformation circuit 1.

The detection control circuit 3 is used to turn on or off the power supply according to an output signal of the current detection circuit 2. The detection control circuit 3 includes a silicon control rectifier (SCR) Q1, a relay J, a reset switch K1 and a diode D5. The relay J of the detection control circuit 3 is electrically connected between the direct-current output terminal of the power supply transformation circuit 1 and the positive pole of the silicon control rectifier Q1 of the detection control circuit 3. The negative pole and the control gate of the silicon control rectifier Q1 of the detection control circuit 3 are electrically connected with the voltage signal output terminal of the current detection circuit 2. The reset switch K1 of the detection control circuit 3 is also electrically connected with the voltage signal output terminal of the current detection circuit 2. The relay J of the detection control circuit 3 has a switch S1 electrically connected between the primary coil 31 of the current transformer T1 of the current detection circuit 2 and the lamp connecting terminals OUT1 and OUT2 of the current detection circuit 2. The switch S1 of the relay J of the detection control circuit 3 has a normally closed contact electrically connected with the lamp connecting terminal OUT2 of the current detection circuit 2.

In practice, when a conducting voltage is supplied between the negative pole and the control gate of the silicon control rectifier Q1 of the detection control circuit 3, the negative pole and the positive pole of the silicon control rectifier Q1 of the detection control circuit 3 are conducted. On the contrary, when the conducting voltage between the negative pole and the control gate of the silicon control rectifier Q1 of the detection control circuit 3 disappears, the negative pole and the positive pole of the silicon control rectifier Q1 of the detection control circuit 3 are disconnected. Thus, when the negative pole and the positive pole of the silicon control rectifier Q1 are conducted, the direct-current voltage of the direct-current output terminal of the power supply transformation circuit 1 is applied onto the relay J of the detection control circuit 3 so that the switch S1 of the relay J of the detection control circuit 3 is changed from the normally-closed state to a normally-open state. On the contrary, when the negative pole and the positive pole of the silicon control rectifier Q1 of the detection control circuit 3 are disconnected, the direct-current voltage of the direct-current output terminal of the power supply transformation circuit 1 applied on the relay J of the detection control circuit 3 disappears so that the switch S1 of the relay J of the detection control circuit 3 is changed from the normally-open state to a normally-closed state.

The current detection circuit 2 further includes a resistor R3 electrically connected with the voltage signal output terminal of the current detection circuit 2 to receive most of the energy of a rush voltage when the abnormal voltage reaction happens in the circuit and to limit the abnormal voltage to a safety range so as to ensure the safety and stability of the circuit.

The current detection circuit 2 further includes an energy-storage capacitor C4 electrically connected with the voltage signal output terminal of the current detection circuit 2 to make the direct-current component of the voltage signal output terminal of the current detection circuit 2 more smooth.

The current detection circuit 2 further includes a high-frequency filter capacitor C3 electrically connected with the voltage signal output terminal of the current detection circuit 2. Thus, when the input terminals CN1 and CN2 of the power supply transformation circuit 1 produce a high-frequency interference signal, the high-frequency impulse from the voltage signal output terminal of the current detection circuit 2 is received by the high-frequency filter capacitor C3 of the current detection circuit 2 to prevent the negative pole and the positive pole of the silicon control rectifier Q1 from being conducted by the high-frequency impulse from the voltage signal output terminal of the current detection circuit 2, and to prevent the switch S1 of the relay J of the detection control circuit 3 from being changed from the normally-closed state to a normally-open state.

The current detection circuit 2 further includes a resistor RT1 electrically connected with the voltage signal output terminal of the current detection circuit 2. Thus, the resistor RT1 of the current detection circuit 2 is used to release an electrical energy stored by the high-frequency filter capacitor C3 and the energy-storage capacitor C4 of the current detection circuit 2 when the power supply is interrupted.

The diode D5 of the detection control circuit 3 is electrically connected with the relay J of the detection control circuit 3 in parallel and has a positive pole electrically connected with the positive pole of the silicon control rectifier Q1 of the detection control circuit 3. Thus, when the negative pole and the positive pole of the silicon control rectifier Q1 are disconnected, the two terminals of the relay J will produce a positive high voltage which is applied on the diode D5 so that the diode D5 can release the positive high voltage of the relay J to prevent the positive high voltage of the relay J from directly impacting and burning the silicon control rectifier Q1 when the negative pole and the positive pole of the silicon control rectifier Q1 are disconnected.

The current detection circuit 2 further includes a light emitting diode LED and a resistor R4 electrically connected between a normally open contact of the switch S1 of the relay J of the detection control circuit 3 and the lamp connecting terminal OUT1 of the current detection circuit 2. Thus, when the normally open contact of the switch S1 of the relay J of the detection control circuit 3 is closed, the lamp is turned off, and the light emitting diode LED lights to indicate an overload condition.

In operation, an alternating current of the alternating-current power supply is supplied into the input terminals CN1 and CN2 of the power supply transformation circuit 1, and the lamp is mounted on the lamp connecting terminals OUT1 and OUT2 of the current detection circuit 2. Thus, the alternating current of the alternating-current power supply passes through the power supply transformation circuit 1 which transforms the alternating current of the alternating-current power supply into a direct-current working voltage and then outputs the direct-current working voltage. On the other hand, the alternating current of the alternating-current power supply passes through the lamp, the normally closed contact of the switch S1 of the relay J of the detection control circuit 3 and the primary coil 31 of the current transformer T1 of the current detection circuit 2 to produce a sensing voltage on the secondary coil 32 of the current transformer T1 of the current detection circuit 2. The sensing voltage is changed according to the change of a load current passing through the lamp.

When the load current of the lamp is increased to exceed a predetermined value, the voltage signal output terminal of the current detection circuit 2 outputs a voltage signal (the conducting voltage of the silicon control rectifier Q1) which is supplied between the negative pole and the control gate of the silicon control rectifier Q1 of the detection control circuit 3, so that the negative pole and the positive pole of the silicon control rectifier Q1 of the detection control circuit 3 are conducted. Thus, when the negative pole and the positive pole of the silicon control rectifier Q1 are conducted, the direct-current voltage of the direct-current output terminal of the power supply transformation circuit 1 is applied onto the relay J of the detection control circuit 3 to energize and start the relay J of the detection control circuit 3 so that the switch S1 of the relay J of the detection control circuit 3 is changed from the normally-closed state to a normally-open state to turn off the lamp so as to prevent the lamp from being worn out due to an excessive load current.

When the reset switch K1 of the detection control circuit 3 is pressed, the negative pole and the control gate of the silicon control rectifier Q1 of the detection control circuit 3 are shorted, so that the negative pole and the positive pole of the silicon control rectifier Q1 of the detection control circuit 3 are disconnected. Thus, when the negative pole and the positive pole of the silicon control rectifier Q1 of the detection control circuit 3 are disconnected, the direct-current voltage of the direct-current output terminal of the power supply transformation circuit 1 applied on the relay J of the detection control circuit 3 disappears so that the switch S1 of the relay J of the detection control circuit 3 is changed from the normally-open state to a normally-closed state to turn on the lamp again.

It is to be noted that, the resistor RT1 of the current detection circuit 2 is used to release the electrical energy stored by the high-frequency filter capacitor C3 and the energy-storage capacitor C4 of the current detection circuit 2 when the power supply to the lamp is interrupted to turn off the lamp. Thus, the voltage of the high-frequency filter capacitor C3 and the energy-storage capacitor C4 of the current detection circuit 2 will not be greater than the conducting voltage of the silicon control rectifier Q1 to prevent the negative pole and the positive pole of the silicon control rectifier Q1 of the detection control circuit 3 from being conducted and to prevent the switch S1 of the relay J of the detection control circuit 3 from being disposed at the normally-closed state constantly so that the lamp can be turned on after the reset switch K1 of the detection control circuit 3 is pressed.

Accordingly, when the load current of the lamp is increased to exceed a predetermined value, the power supply to the lamp is interrupted to turn off the lamp so as to prevent the lamp from being worn out due to an excessive load current. In addition, the power supply transformation circuit 1 can drop the voltage of the alternating-current power supply by the capacitor C1 without needing a transformer so as to function as a simple direct-current steady-state voltage output circuit. Further, the power supply transformation circuit 1 has a smaller volume and has a simplified structure, thereby saving the space and the price.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An electronic current limiter, comprising:
a power supply transformation circuit to transform an alternating-current power supply into a direct-current power supply, wherein the power supply transformation circuit includes two input terminals and a direct-current output terminal;
a current detection circuit to sense and detect a current from the input terminals of the power supply transformation circuit, wherein the current detection circuit includes a current transformer which consists of a primary coil and a secondary coil, the primary coil of the current transformer of the current detection circuit is electrically connected between two lamp connecting terminals of the current detection circuit and the input terminals of the power supply transformation circuit, and the secondary coil of the current transformer of the current detection circuit is connected to a rectifying diode of the current detection circuit to form a voltage signal output terminal of the current detection circuit;
a detection control circuit to turn on or off the power supply according to an output signal of the current detection circuit, wherein the detection control circuit includes a silicon control rectifier, a relay and a reset switch, the relay of the detection control circuit is electrically connected between the direct-current output terminal of the power supply transformation circuit and a positive pole of the silicon control rectifier of the detection control circuit, the silicon control rectifier of the detection control circuit has a negative pole and a control gate electrically connected with the voltage signal output terminal of the current detection circuit, the reset switch of the detection control circuit is electrically connected with the voltage signal output terminal of the current detection circuit, the relay of the detection control circuit has a switch electrically connected between the primary coil of the current transformer of the current detection circuit and the lamp connecting terminals of the current detection circuit, the switch of the relay of the detection control circuit has a normally closed contact electrically connected with one of the lamp connecting terminals of the current detection circuit.

2. The electronic current limiter in accordance with claim 1, wherein the current detection circuit further includes an energy-storage capacitor electrically connected with the voltage signal output terminal of the current detection circuit to make a direct-current component of the voltage signal output terminal of the current detection circuit more smooth.

3. The electronic current limiter in accordance with claim 2, wherein the current detection circuit further includes a resistor electrically connected with the voltage signal output terminal of the current detection circuit to release an electrical energy stored by the energy-storage capacitor of the current detection circuit when the power supply is interrupted.

4. The electronic current limiter in accordance with claim 1, wherein the current detection circuit further includes a high-frequency filter capacitor electrically connected with the voltage signal output terminal of the current detection circuit.

5. The electronic current limiter in accordance with claim 4, wherein the current detection circuit further includes a resistor electrically connected with the voltage signal output terminal of the current detection circuit to release an electrical energy stored by the high-frequency filter capacitor of the current detection circuit when the power supply is interrupted.

6. The electronic current limiter in accordance with claim 1, wherein the detection control circuit further includes a diode which is electrically connected with the relay of the detection control circuit in parallel and has a positive pole electrically connected with the positive pole of the silicon control rectifier of the detection control circuit.

7. The electronic current limiter in accordance with claim 1, wherein the current detection circuit further includes a light emitting diode and a resistor electrically connected between a normally open contact of the switch of the relay of the detection control circuit and another one of the lamp connecting terminals of the current detection circuit.

8. The electronic current limiter in accordance with claim 1, wherein the current detection circuit further includes a resistor electrically connected with the voltage signal output terminal of the current detection circuit to receive an energy of a rush voltage.

9. The electronic current limiter in accordance with claim 1, wherein the power supply transformation circuit includes a capacitor, two resistors, two diodes, a steady-state voltage diode and an energy-storage filter capacitor.

10. The electronic current limiter in accordance with claim 1, wherein the energy-storage filter capacitor of the power supply transformation circuit has a terminal to function as the direct-current output terminal of the power supply transformation circuit.

* * * * *